May 27, 1969  E. A. MEYER  3,445,979
MOLDING ASSEMBLY AND ADAPTOR
Filed Nov. 6, 1967  Sheet 1 of 3
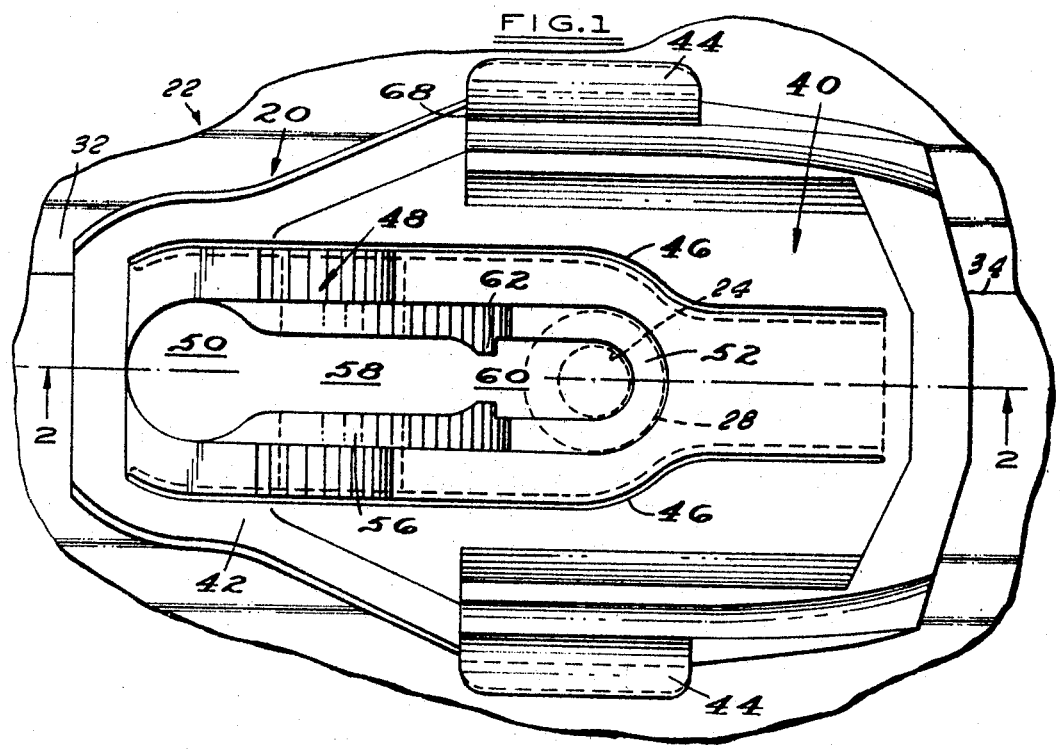
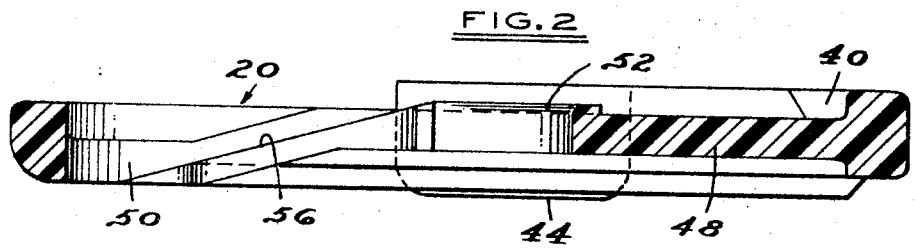
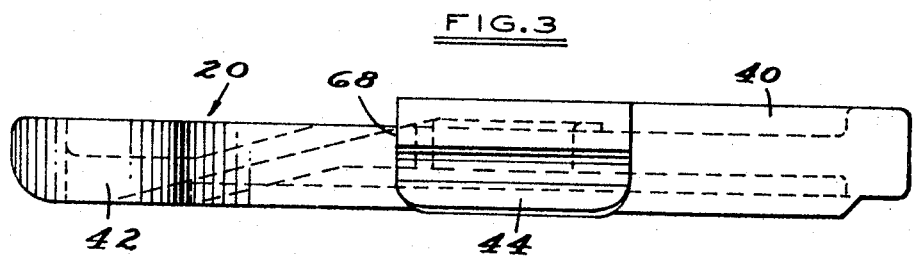
INVENTOR
ENGELBERT A. MEYER
BY
*Burton & Parker*
ATTORNEYS May 27, 1969
E. A. MEYER
3,445,979
MOLDING ASSEMBLY AND ADAPTOR
Filed Nov. 6, 1967
Sheet 2 of 3
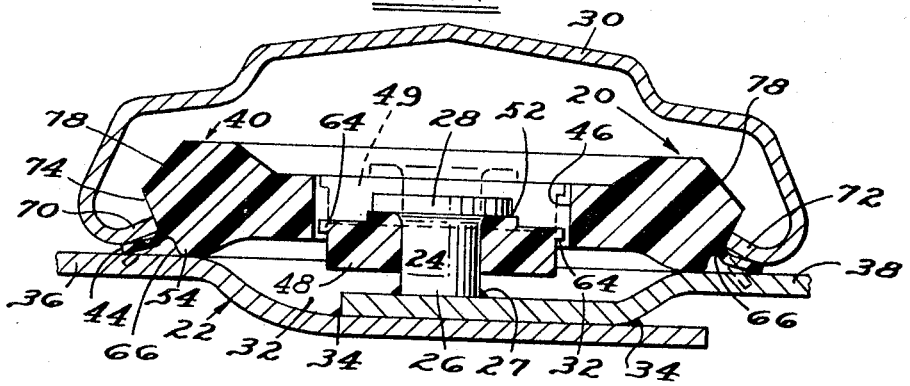
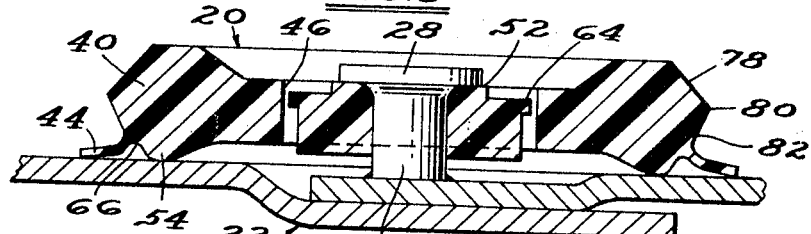
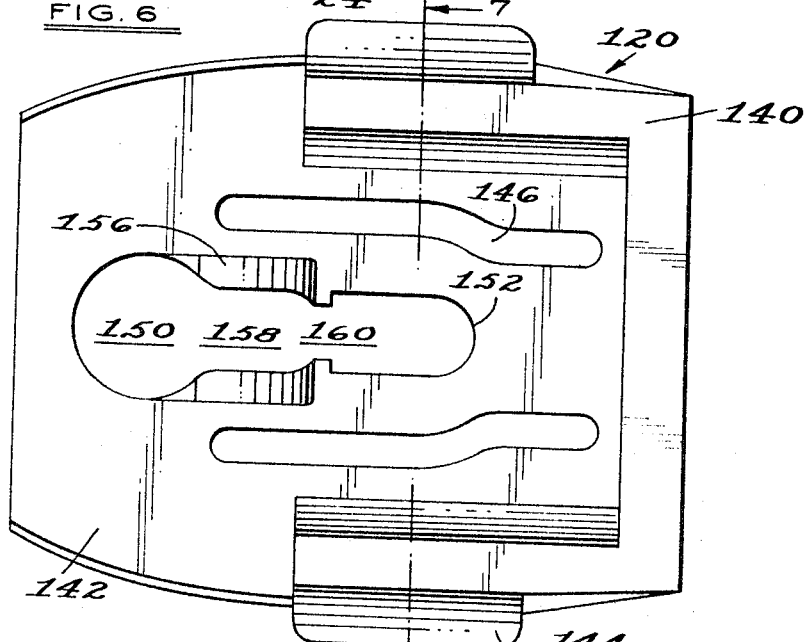
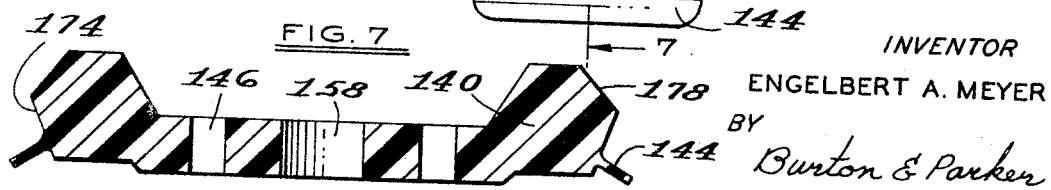
INVENTOR
ENGELBERT A. MEYER
BY
Burton & Parker
ATTORNEYS May 27, 1969            E. A. MEYER            3,445,979
MOLDING ASSEMBLY AND ADAPTOR
Filed Nov. 6, 1967            Sheet 3 of 3
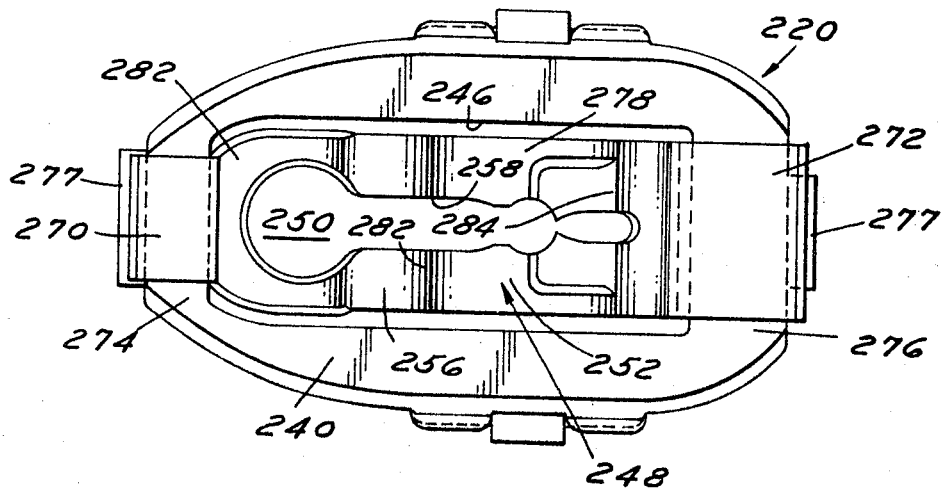
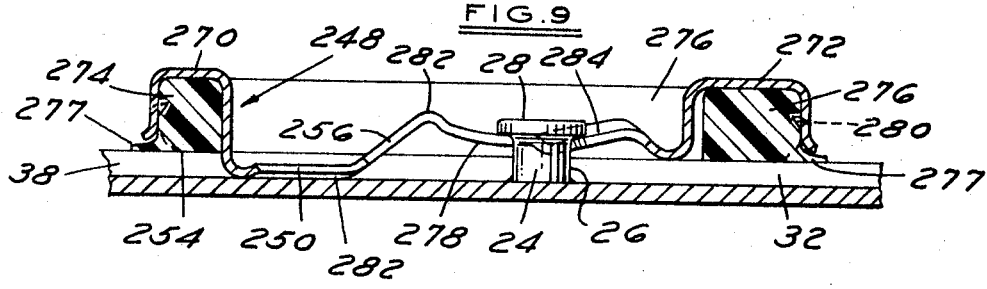
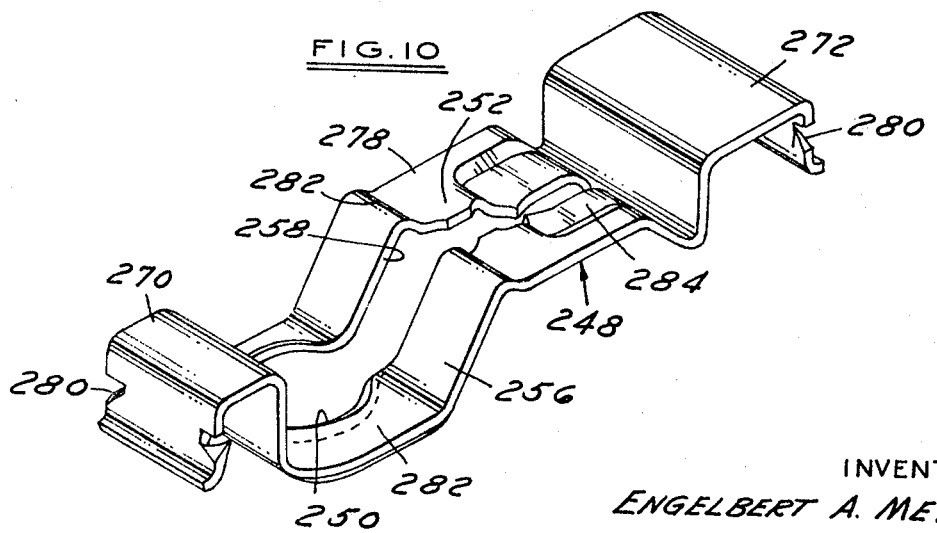
INVENTOR
ENGELBERT A. MEYER
BY
*Burton & Parker*
ATTORNEYS United States Patent Office 3,445,979
Patented May 27, 1969

3,445,979
MOLDING ASSEMBLY AND ADAPTOR
Engelbert A. Meyer, Union Lake, Mich., assignor to Warren Fastener Corporation, Mount Clemens, Mich., a corporation of Michigan
Continuation-in-part of application Ser. No. 539,106, Mar. 31, 1966. This application Nov. 6, 1967, Ser. No. 684,590
Int. Cl. E04c 2/38; E04f 19/02
U.S. Cl. 52—718    9 Claims

ABSTRACT OF THE DISCLOSURE

This disclosure relates to a molding assembly adapted to secure a molding device over a support channel, and a plastic adaptor having a sheet metal insert. The molding device over a support channel, and a plastic adaptor having a sheet metal insert. The molding assembly has a headed button secured to the support within the channel, and an adaptor spanning the channel having a ramp portion resiliently biased beneath the button head within the support channel. The forward portion of the adaptor may be received within the channel to receive the keyhole slot defined in the adaptor ramp portion over the button head, and secure the adaptor in place.

Related applications

This application is a continuation-in-part of application Ser. No. 539,106, filed Mar. 31, 1966, now abandoned.

Field of the invention

Molding devices are used in the manufacture of automobiles, refrigerators and the like to meet functional and design requirements. Preferably, the button is attached to the support in accordance with the method described in U.S. Letters Patent No. 3,153,468, which is assigned to the assignee in the instant application, wherein the button is welded to steel or adhesively secured to various materials including steel; thereby eliminating the corrosion problem inherent in previosuly used techniques requiring a hole through the support. A series of spaced buttons for a single longitudinal molding device may be applied in a gang operation with accurate alignment. The instant application will be described in the context of an automotive molding assembly.

The adaptor of this invention was designed to meet a particular and troublesome design requirement; that of attaching a molding device over a channel defined in an automotive component, such as a body panel. Such a body channel may be a lap weld between adjacent body panels. A problem in the design of the structure results in the difficulty in maintaining the close tolerances in lap welding, or the like, as required in previously disclosed adaptors and molding assemblies. Further, the weld button may be canted, requiring an adaptor to compensate for misalignment of a button secured within the channel. When it is remembered that the button of this assembly is preferably "B-B shot" size, an appreciation is reached of the difficulty in designing an adaptor which will accommodate variances of 0.100 inch in the channel depth, such as results in lap welding or the like.

Description of the prior art

The adaptors disclosed by the prior art generally do not permit relative movement between the button seat and the adaptor body, and are therefore restricted to use in assemblies having accurately aligned buttons.

Summary of the invention

The molding assembly of my invention includes a button having an enlarged head portion secured to the support, a molding device, and an adaptor interconnecting the molding device to the button head in overlying relation. The adaptor has a pair of longitudinally extending slits defining an inclined ramp portion therebetween. The ramp portion has a longitudinally extending slot therein open at one end for receiving the head portion of the button, and a button seat at the rearward end tensioned beneath the enlarged head portion of the button. The button is received on the button seat to bias the ramp portion toward the support, into the support channel, and the adaptor has longitudinal bases defined on opposite sides of the support channel which are tensioned against the support and span the channel. The adaptor is provided with cooperating attaching means for mounting the molding device in overlying relation to the support.

In the preferred embodiment of the adaptor, the ramp portion is provided with opposed flanges which extend into the slits defining the ramp portion to limit movement of the adaptor body perpendicular to the slits. The keyhole slot defined in the ramp portion may be provided with a restricted opening to prevent withdrawal of the button from the button seat, and the forward end of the adaptor, in the preferred embodiment, is adapted to be received within the channel of the support to permit receipt of the button head in the keyhole slot.

Another embodiment of the adaptor of my invention includes a nonmetallic adaptor body having a longitudinal cut-out portion, and a sheet metal insert having opposed end portions overlying opposed end walls of the adaptor body. The midportion of the sheet metal insert is received within the longitudinal cut-out portion of the adaptor body, but is spaced from the side walls of the adaptor body to permit relative movement between the insert and the body portion in the axis of the button. The insert midportion includes a portion lying adjacent the plane of the base of the adaptor having an enlarged opening adapted to receive the enlarged head of the button therethrough, and an inclined ramp portion having a slot communicating with the enlarged opening adapted to receive the shank of the button. The button head is received through the enlarged opening, and is biased up the inclined ramp portion to tension the insert toward the support, and the adaptor body base against the support. In the disclosed embodiment, the opposed end portions of the sheet metal insert have inwardly struck barbs which grip the nonmetallic adaptor body and retain the insert thereon. The opposed ends of the insert are preferably spaced from the plane of the adaptor base to prevent contact of the ends with the surface of the support. According to the embodiment of the two-part adaptor disclosed herein, the portion of the insert which receives the button head lies below the plane of the adaptor body base to receive a button secured within a support channel.

On the assembly line, the adaptor is connected to a button by tilting the forward portion of the adaptor into the channel of the support to receive the enlarged head portion of the button through the keyhole slot. The adaptor is then shifted to seat the button head, which biases the inclined ramp portion of the adaptor toward the support, and frictionally seat the adaptor on the automotive component in approximate final alignment for acceptance of a flanged molding device. The opposed inturned flanges of the molding are then snapped over the adaptor to lock the molding device on the automotive support.

The adaptor need not be accurately aligned prior to application of the molding device. A pilot is provided on the adaptor which is engaged by the inturned flanges of the molding device, thereby camming the adaptor into final alignment position. The pilot of the adaptor can be formed to correct misalignment, the mere pressing application of the molding device causing the desired predetermined final alignment of the adaptor for final locking of the molding device thereto. Laterally extending nonmetallic fins may be provided on the adaptor to provide insulation against electrolytic corrosion of the metal parts, and to resiliently tension the adaptor seat against the button head. The fins are, in the completed assembly, sandwiched between the molding device and the surface of the automotive support.

The above described assembly provides a reliable and relatively inexpensive means of securing a hollow molding device over a channel, which is not subject to corrosion, and which will compensate for alignment tolerances outside the limits of previously disclosed techniques.

Other objects, advantages, and meritorious features will more fully appear from the following specification, claims, and accompanying drawings.

*Brief description of the drawings*

FIGURE 1 is a top elevation of one embodiment of the adaptor of this invention;

FIGURE 2 is a cross sectional side view of the adaptor shown in FIGURE 1, in the direction of view arrows 2—2;

FIGURE 3 is a side view of the adapter shown in FIGURE 1;

FIGURE 4 is a cross sectional view of a molding assembly;

FIGURE 5 is similar to FIGURE 4, except for the depth of the support channel;

FIGURE 6 is a top elevation of another embodiment of the adaptor of this invention;

FIGURE 7 is a cross sectional view of the adaptor shown in FIGURE 6 in the direction of view arrows 6—6;

FIGURE 8 is a top elevation of another embodiment of the adaptor of my invention;

FIGURE 9 is a side cross sectional view of the adaptor shown in FIGURE 8, in combination with a support having a button attached thereto; and FIGURE 10 is a perspective view of the sheet metal insert shown in combination with the adaptor body in FIGURES 8 and 9.

*Description of the preferred embodiments*

In FIGURES 1 to 5, I show an embodiment of the molding assembly of this invention, and the details of the adaptor 20 of this assembly. The molding assembly shown in FIGURE 4, comprises a support 22, a button 24 having an enlarged head 26 spaced from the support and a shank portion 28 secured to the support, a hollow molding device 30, and an adaptor 20 interconnecting the molding device to the support, which may be an automotive body panel or the like. The support 22 has a longitudinal channel 32 defined therein, which may be employed to conceal a lap weld 34 between body panels 36 and 38. The button shank 26 has been secured to the support within the channel 32, as by welding as shown at 27.

The adaptor 20 has a body portion 40, and a forward nose portion 42 of reduced width adapted to be received within the support channel 32 to receive the button head 28, as shown in FIGURE 1. The nose portion 42 also functions as a pilot to align the adaptor during attachment of the molding, as more fully described in my copending application, Ser. No. 337,859, filed Jan. 15, 1964. The body portion has a pair of lateral fins 44 extending downwardly at an angle from the bottom of the body, which serve as insulation against electrolytic corrosion between the molding device 30 and the support 22.

A pair of longitudinal slits 46 in the adaptor body define an inclined ramp 48 therebetween. The inclined ramp has a keyhole slot 58 therein, having an enlarged opening 50 at the forward end for receiving the button head therethrough, and terminating in a button seat 52 for bearing engagement against the underside of the button head 28. The ramp is inclined toward the button seat, so that as the adaptor is shifted toward the button, the ramp is biased toward the support, tensioning the adaptor against the support. When the adaptor is in final position, a frictional face-to-face engagement of longitudinal bases 54 with the support, adjacent the channel 32, is produced which maintains the adaptor in a fixed position on the support. The fins 44 are also biased by this movement, and aid in the maintenance of the adaptor in approximate aligned condition; the fins being swung to a flattened condition substantially coplanar with the bases 54. The relaxed position of the ramp is shown in FIGURE 5 in phantom at 49.

An inclined channel 56 is provided adjacent the slot 58 in the ramp (see FIGURE 1) to guide the button toward the seat 52. And, the slot is restricted at 60, by a pair of tangs 62, which inhibit removal of the adaptor from the button shank 26. The slits 46 provide the lateral resiliency which allows the button shank to pass through the restricted opening 60, whose width is less than the diameter of the button shank 26. The ramp may also be provided with a pair of opposed flanges 64 (see FIGURE 4) which extend into the slits 46 to inhibit lateral movement of the molding 30 about the button 24. A clearance of less than 0.010 inch can thus be provided between the ramp 48 and the body portion 40, and yet allow sufficient resiliency to accommodate 0.010 inch variances in button height, and misalignments due to button tilt.

The capacity of the adaptor to accommodate varying channel depths, and button misalignment, is illustrated in FIGURES 4 and 5, wherein a comparatively shallow channel is shown in FIGURE 5, and a deeper channel is shown in FIGURE 4.

Critical manufacturing and assembling tolerances are met by the adaptor body design. The longitudinal bases 54 are relieved by channels 66 (FIGURE 4), at the juncture of the fins 44 with the body 18, to eliminate any effect of the bias of the fins condition on the maintenance of the bases 54 in face-to-face dimension controlling contact with the support 22. Top to bottom transverse cutout portions 68, between the body portion 40 and the pilot or nose portion 42, are also provided for this purpose.

The molding device 30 is a longitudinally extending hollow channel having opposed inturned longitudinal flanges 70 and 72, as shown in FIGURE 4. The configuration of the molding device is optional, and will depend upon its design and functional requirements. On installation one of the molding flanges 70 may be moved into the longitudinal groove 74 on the side of the body portion 40. The other inturned flange 72 of the molding is then pressed against the tapered side 78 of the body to expand the molding device. The flange 72 may then be moved past the vertical side wall 80 (see FIGURE 5), and will spring into the groove 82 on the opposite side of the body. In the assembled position, the tapered walls 74 and 82 of the adaptor extend to overlie the inturned flanges of the molding device to inhibit removal of the molding. It will be noted that the nonmetallic fins 44 extend laterally of the body 18 to serve as insulation against electrolytic corrosion between the molding and the support, the fins 44 being sandwiched therebetween as shown in FIGURE 4.

This arrangement spaces the molding device from the automobile support, thereby allowing intercirculation under the molding device in the portions between the adaptors to evaporate moisture and inhibit corrosion problems.

FIGURES 6 and 7 illustrate another embodiment of an adaptor, which is similar in construction to the adaptor shown in FIGURES 1 to 5, except that the slits 146 are wider, and therefore need not extend as far longitudinally to provide the requisite resiliency described hereinabove. The forward nose portion 142 has also been modified. The configuration of the nose portion will be dependent upon the width of the channel, as the nose portion is designed to be received within the channel for receiving the button head. The adaptor has been otherwise numbered to show the similarity to the adaptor shown in FIGURES 1 to 5.

FIGURES 8 to 10 illustrate an improved two-part adaptor which combines the advantages of an insulating plastic adaptor with the strength of a metal clip. The adaptor 220 has a nonmetallic body 240 having a longitudinal cut-out portion 246, and a sheet metal insert 248. The opposed ends 270 and 272 of the insert overlie the opposed end walls 274 and 276 respectively of the adaptor body, and the midportion 278 is received within the longitudinal cut-out of the body. The midportion is spaced from the opposed walls of the cut-out to permit relative motion of the insert toward the support, and the ends have inwardly struck barbs 280 which grip the nonmetallic body as shown in FIGURE 9, to lock the insert in place. The ends of the insert are preferably spaced from the plane of the base 254 of the adaptor body to prevent direct metal-to-metal contact between the insert and the support 38, as shown in FIGURE 9, and axially extending fins 277 may be provided to serve as further insulation between the insert and the support.

The forward portion 282 of the insert, within the longitudinal cut-out portion 246, lies in a plane adjacent the plane of the base 254 of the adaptor body, and has an enlarged opening 250 adapted to receive the head portion 28 of the button 24 therethrough. The insert continues to define in inclined ramp portion 256, and a button seat 252. The slot 258 defined in the ramp portion communicates with the enlarged opening 250 to receive the shank portion 26 of the button therethrough, and the ridges 282 and 284 prevent withdrawal or removal of the button respectively.

In the assembly operation, the enlarged opening 250 of the insert is received over the button head 28, and the adaptor is shifted to seat the button on the button seat 252, as shown in FIGURE 9. The inclined ramp portion 256 tensions the insert towards the support, beneath the button head, and the ridge 282 prevents withdrawal of the adaptor. In the embodiment shown in FIGURES 8 to 10, the forward portion 282 of the insert extends to lie in a plane below the plane of the adaptor body base 254 to facilitate attachment of the adaptor over a support channel 32, as shown in FIGURES 1, 4 and 5. The inclined ramp portion 256, in this environment, tensions the insert 248 toward the support within the support channel 32, and the longitudinal bases 254, which span the support channel, against the support.

While various materials may be used for all parts of the assembly, the automotive industry utilizes metal primarily for the automotive support and for the molding device. Steel is primarily used for the automotive support, with stainless steel being used for the button as well as with cold-rolled zinc plated steel. The buttons are stud welded to prefabricated automotive support, before painting, or at least before final finishing, in a predetermined orientation. After cleaning, coating, and polishing, the automotive support is ready to receive the adaptor. Preferably, the adaptor is made of a nonmetallic resilient material to provide an electrolytic corrosion barrier between the dissimilar metal parts, and provide the resiliency required for assembly. A suitable material for the adaptor is a thermoplastic resin, such as fiber filled nylon, polycarbonates, acetal resins, and polypropylene.

What is claimed is:

1. A molding assembly, comprising: a support having a longitudinal channel defined therein, a button secured to said support within said channel having an enlarged head portion spaced from the support, a molding device, and an adaptor secured beneath the button head interconnecting the molding device to the support in overlying relation to said channel, said adaptor having a pair of longitudinally extending slits defining an inclined ramp portion therebetween, said ramp portion having a longitudinally extending slot therein open at one end for receiving said head portion of the button, and a button seat at the rearward end of said slot tensioned beneath the enlarged head portion of said button biasing the ramp towards said support into said support channel, said adaptor having a forward end adapted to be received within the channel to receive the button head and a rearward end adapted to span said channel, and cooperating attaching means on said adaptor and said molding device mounting said molding device on said support.

2. The molding assembly defined in claim 1, characterized in that said ramp is provided with opposed flanges extending into said slits to limit the movement of said adaptor body perpendicular to said slits.

3. An adaptor for attaching a channel to a support having a button attached thereto, said button having an enlarged head portion spaced from the surface of the support, comprising: a non-metallic adaptor body having a longitudinal cut-out portion with opposed side walls and end walls, and a resilient sheet metal insert having opposed end portions overlying said opposed end walls of said adaptor body, and a midportion received within said longitudinal cut-out portion and spaced from said side walls of the longitudinal cut-out portion, said resilient insert flexing within said longitudinal cut-out portion toward the support upon receipt of said button, said insert midportion having a portion lying adjacent the plane of the base of said adaptor body having an enlarged opening adapted to receive the enlarged head of the button therethrough and an inclined ramp portion having a slot communicating with said enlarged opening adapted to receive the shank portion of the button to bias the sheet metal insert toward the support.

4. The adaptor defined in claim 3, characterized in that said opposed end portion of said metal insert have inwardly struck barbs which grip the nonmetallic adaptor body and retain the insert thereon.

5. The adaptor defined in claim 3, characterized in that said portion of the insert having the enlarged opening lies below the plane of the adaptor body base to receive a button secured within a support channel.

6. The adaptor defined in claim 3, characterized in that said opposed ends of the sheet metal insert are spaced from the plane of the base to prevent contact of the ends with the surface of the support.

7. The molding assembly defined in claim 1, characterized in that said elongated slot is restricted to a width less than the diameter of the button shank adjacent said button seat, and said longitudinally extending slits provide the lateral resiliency necessary to permit said button to pass through the restricted opening.

8. A molding assembly, comprising: a support, a button extending from the support having an enlarged head, a molding device, and an adaptor interconnecting the molding device to the support in overlying relation, said adaptor having a body portion and an elongated button receiving slot defined in an inclined ramp portion biasing the adaptor toward the support as the button is received in said slot, said ramp portion joined to said body portion at opposite ends in the axis of said slot, said slot terminating in a button seat adjacent the midportion of said ramp portion at the vertical extent of said ramp portion receiving said enlarged head of the button, said adaptor having a pair of slits on opposite sides of said ramp portion and extending beyond said button seat but spaced from the opposed ends of the adaptor, the upper surface of said button seat flexed below the upper plane of the body portion of the adaptor adjacent said slits resiliently biasing said adaptor against the support upon receipt of a button on said button seat.

9. The molding assembly defined in claim 8, characterized in that said adaptor body portion is plastic, and said ramp portion including said elongated button receiving slot is a resilient sheet metal insert.

References Cited

UNITED STATES PATENTS

| | | | |
|---|---|---|---|
| 1,261,835 | 4/1918 | Martin | 5—299 |
| 2,203,397 | 6/1940 | Taylor | 85—36 |
| 2,358,890 | 9/1944 | Tinnerman | 85—36 |
| 3,115,225 | 12/1963 | Fraylick et al. | 52—718 |
| 3,127,965 | 4/1964 | Weisenberger | 52—718 |
| 3,188,730 | 6/1965 | Meyer | 52—718 X |
| 3,239,988 | 3/1966 | Meyer | 52—718 |
| 3,246,375 | 4/1966 | Landwer | 52—718 |

FRANCIS K. ZUGEL, *Primary Examiner.*